United States Patent Office 3,065,282
Patented Nov. 20, 1962

3,065,282
SIDE CHAIN ALKYLATION OF SUBSTITUTED AROMATIC HYDROCARBONS
Gert G. Eberhardt, Philadelphia, Pa., assignor to Sun Oil Company, Philadelphia, Pa., a corporation of New Jersey
No Drawing. Filed Nov. 21, 1960, Ser. No. 70,440
10 Claims. (Cl. 260—671)

This invention relates to the alkylation of substituted aromatic hydrocarbons with olefins in a manner whereby alkylation occurs at the alpha carbon atom of the substituent group. The invention also embraces a novel catalyst system utilized in achieving such alkylation.

It is known in the prior art that alkali metals when activated by means of certain promoters can catalyze the alkylation of substituted aromatic hydrocarbons in a manner such that alkylation occurs at the alpha carbon atom of the side chain rather than on the aromatic nucleus. Such a procedure wherein potassium promoted by means of anthracene was used as the catalyst has been disclosed by Schaap and Pines, J.A.C.S., vol. 79, pages 4967–4970. These authors showed that in addition to alkylation ring closure can occur to an extent, resulting in the formation of indanes along with alkyl benzene. Other promoters which have been used with alkali metals to catalyze the side chain alkylation of aromatics are acetylenic hydrocarbons (United States Patent No. 2,670,390), heterocyclic nitrogen compounds (United States Patent No. 2,688,044), organic peroxy compounds (United States Patent No. 2,748,178) and conjugated diolefins (United States Patent No. 2,849,508).

The present invention provides an improved catalyst system for effecting the foregoing type of reaction, which system has substantially greater catalytic activity than any of the catalyst combinations mentioned above.

According to the invention, the side chain alkylation of substituted aromatics is effected by means of an alkali metal promoted by means of a compound having the formula $MAlR_4$ wherein M is an alkali metal and R is an alkyl group having 2–10 carbon atoms. The alkylation reaction is effected by contacting the olefin with the substituted aromatic at a temperature in the range of 150–300° C. in the presence of this catalyst combination. The activity of the catalyst is such that the reaction will proceed considerably more rapidly than when the prior art catalysts are used and the reaction will begin at a lower temperature. Furthermore there is no induction period such as is generally required with the catalyst systems heretofore known. Also the activity of the present catalyst system for effecting ring closure is substantially higher and hence this catalyst is capable of producing higher yields of indanes than has been obtained with the prior art catalyst systems.

The aromatic to be alkylated must have at least one saturated hydrocarbon group substituent in which the carbon atom attached to the aromatic nucleus is itself attached to at least one hydrogen atom. The alkylation effected by the catalyst system occurs at such alpha carbon atom. Any aromatic hydrocarbon of this kind can be alkylated in the present process. The following are examples of such alkylatable aromatics: toluene, xylenes, ethyl benzene, n-propyl benzene, i-propyl benzene, normal and secondary butyl benzene, cumene, tetralin, cyclohexyl benzene, methyl naphthalenes, dimethyl naphthalenes and the like.

Any olefin can be used as the alkylating agent and the number of carbon atoms therein can vary, for example, from two to twenty. Ethylene is the preferred olefin but higher olefins, such as propylene, isobutylene, hexenes, octenes, propylene trimers and tetramers, etc. will function satisfactorily.

In preparing the catalyst system any of the alkali metals can be used but potassium and sodium are preferred. Potassium is especially preferred since it provides the most active catalyst system. As previously shown, the promoter is an alkali metal aluminum tetra-alkyl having the formula $MAlR_4$. This material is formed by adding the alkali metal to the aromatic charge and then adding an aluminum trialkyl. Upon mixing the mixture the following reaction occurs, potassium being taken as illustrative:

$$4AlR_3 + 3K \rightarrow 3KAlR_4 + Al$$

This reaction takes place even at room temperature. In order to have an active catalyst system free alkali metal must be present. Hence it can be seen from the equation that the molar ratio of the alkali metal to aluminum trialkyl should be in excess of 3:4. The proportion does not need to exceed this ratio greatly, since only a small excess of the free alkali metal is required; but generally a substantial excess of the alkali metal will be used. Active catalyst systems are obtained when the amounts of aluminum trialkyl and alkali metal used are such that the molar proportion of free alkali metal to $MAlR_4$ in the so prepared catalyst lies, for example, in the range of 0.1–50. For preparing the catalyst aluminum triethyl and aluminum triisobutyl are preferred because of availability, but any aluminum trialkyl in which the alkyl group has two to ten carbon atoms is suitable.

In a specific embodiment of the invention a methyl benzene, e.g. toluene, and an olefin having 2–4 carbon atoms, e.g. ethylene, are reacted to produce indanes, such as ethyl indane, diethyl indane and triethyl indane, in substantial yields. This embodiment is illustrated by the following specific example.

EXAMPLE I

The reactor used was a 300 ml. rocking-type autoclave containing a batch of steel balls to provide better agitation. The reactor was flushed with an inert gas and then 120 ml. of toluene, 5 g. of potassium and 5 ml. of aluminum triethyl were added to it. The molar ratio of potassium to aluminum triethyl was about 3.5:1. Ethylene was pressured into the autoclave to a pressure of 1000 p.s.i.g. and the autoclave was slowly heated while shaking. When 150° C. was reached, an exothermic reaction set in and the temperature rose rapidly to 200° C. After one hour at this temperature the reaction was complete as indicated by no further drop in pressure. The reactor was then cooled down and residual gas, which was composed mainly of ethane, was vented. Alcohol was added to destroy the catalyst and the mixture was washed with water several times to remove the alcohol and catalyst residue. The reaction product was then fractionally distilled and several cuts were taken as listed in Table I.

Table I

| Cut Points, ° C. | Percent of Cut on Total Material Above 130° C. | Refractive Index, $n^{20}$ | Main Constituent (Boiling Point, ° C.) |
|---|---|---|---|
| 130–183 | 20.1 | 1.4920 | n-propyl-benzene (159). |
| 183–203 | 23.6 | 1.4900 | isoamyl benzene (189). |
| 203–218 | 9.7 | 1.5142 | 1-ethyl-indane (212). |
| 218–228 | 3.5 | 1.5143 | (indanes). |
| 228–252 | 29.2 | 1.5136 | diethyl-indanes (235–240). |
| 252–275 | 8.3 | 1.5132 | triethyl-indanes (260–270). |
| Residue | 5.6 | 1.5198 | |

While the cuts were taken over the various temperature ranges shown in Table I, most of each fraction generally distilled over a narrow range. For example, most of the first cut distilled over in the range of 155–160° C., while most of the second cut distilled at about 189° C. (corresponding to the boiling point of isoamyl benzene). The listed refractive indexes which are above 1.51 indicate that the material boiling above 203° C. was mainly alkyl indanes, while the lower refractive indexes found for the first two cuts show that these were composed mainly of alkyl benzenes. The data indicate that more than half of the reaction product was alkyl indanes, showing that the present catalyst system has high activity for effecting ring closure in addition to alkylation.

The following example is presented for comparative purposes to illustrate how the results obtained with a prior art catalyst, namely, potassium promoted with anthracene, differ from present results as shown in Example I.

EXAMPLE II

The reaction was carried out in essentially the same manner as described in Example I except that a 125 ml. rocking-type autoclave was used. The charge to the reactor was 60 ml. of toluene, 3 g. of potassium and 0.5 g. of anthracene. Again the starting pressure of ethylene was 1000 p.s.i.g. The mixture was slowly heated to 210° C. without any appreciable reaction occurring for a time. Even after one hour at that temperature only a small pressure drop was noted, indicating that this type of catalyst system requires an induction period. The rate of consumption of ethylene then increased during the next five hours. The reaction product was worked up in the same manner as in Example I, and results on the distillation cuts are shown in Table II.

*Table II*

| Cut points,°C. | Percent of cut on total material above 130° C. | Refractive index, $n^{20}$ |
| --- | --- | --- |
| 130–183 | 4.2 | 1.4868 |
| 183–203 | 50.7 | 1.4880 |
| 203–218 | 8.5 | 1.4952 |
| 218–228 | 4.2 | 1.5032 |
| 228–252 | 12.7 | 1.5090 |
| Residue | 19.7 | 1.5148 |

The refractive indexes in Table II show that the potassium-anthracene catalyst combination produces considerably less indanes than are obtained with the catalyst of Example I. The higher temperature and longer time required to effect the reaction show that the potassium-anthracene catalyst is much less active than the catalyst of the prevent invention.

When the experiment described in Example I was repeated except that sodium was substituted for potassium, the reaction set in when a temperature of 180° C. was reached and it proceeded rapidly within one hour. However, the reaction product contained substantially less alkyl indanes than when potassium was used and the major products were n-propylbenzene and isoamyl benzene. In comparison, when a sodium-anthracene catalyst was used in similar manner except that the mixture was heated to about 200° C., an induction period of about one hour was required for the reaction to start and an additional five hours was required to consume a comparable amount of ethylene as when the Na-NaAlR$_4$ catalyst was used.

Substantially similar results are obtained when the other alkali metals are substituted for potassium or sodium and when other aluminum trialkyls are substituted for aluminum triethyl.

I claim:

1. Method which comprises contacting an olefin hydrocarbon with an aromatic hydrocarbon having attached thereto a carbon atom of a saturated hydrocarbon group, which carbon atom is attached to at least one hydrogen atom, at a temperature in the range of 150–300° C. in the presence of an alkali metal promoted by means of a compound having the formula MAlR$_4$ wherein M is an alkali metal and R is an alkyl group having 2–10 carbon atoms, whereby alkylation at said carbon atom occurs.

2. Method according to claim 1 wherein said alkali metal is potassium.

3. Method according to claim 1 wherein said alkali metal is sodium and the temperature is at least 180° C.

4. Method according to claim 1 wherein said olefin is ethylene.

5. Method according to claim 1 wherein said alkali metal is potassium and said olefin is ethylene.

6. Method of forming indanes which comprises contacting an olefin having 2–4 carbon atoms with a methyl benzene at a temperature in the range of 150–300° C. in the presence of an alkali metal promoted by means of a compound having the formula MAlR$_4$ wherein M is an alkali metal and R is an alkyl group having 2–10 carbon atoms, whereby alkylation at said methyl group and ring closure occurs to form indanes.

7. Method according to claim 6 wherein said alkali metal is potassium, said olefin is ethylene and said aromatic hydrocarbon is toluene.

8. A catalyst system comprising an alkali metal promoted by a compound having the formula MAlR$_4$ wherein M is an alkali metal and R is an alkyl group having 2–10 carbon atoms.

9. A catalyst system comprising potassium promoted by a compound having the formula KAlR$_4$ wherein R is an alkyl group having 2–10 carbon atoms.

10. A catalyst system comprising sodium promoted by a compound having the formula NaAlR$_4$ wherein R is an alkyl group having 2–10 carbon atoms.

References Cited in the file of this patent

UNITED STATES PATENTS 2,927,085     Gordon et al. _____ Mar. 1, 1960
2,927,086     Gordon et al. _____ Mar. 1, 1960